US005586686A

United States Patent [19]

Bustos et al.

[11] Patent Number: 5,586,686

[45] Date of Patent: Dec. 24, 1996

[54] TEMPERATURE MAINTAINED FOOD DISPENSING SYSTEM AND METHOD

[75] Inventors: Rafael T. Bustos, Alpharetta, Ga.; George LaPolice, Somerville, N.J.

[73] Assignee: L&P Property Management Company, Chicago, Ill.

[21] Appl. No.: 449,935

[22] Filed: May 25, 1995

Related U.S. Application Data

[63] Continuation-in-part of Ser. No. 404,243, Mar. 15, 1995, abandoned.

[51] Int. Cl.[6] ..... B23Q 7/04

[52] U.S. Cl. ..... 221/211; 186/55

[58] Field of Search ..... 221/211, 278; 186/52, 53, 55; 406/1, 2, 3

[56] References Cited

U.S. PATENT DOCUMENTS

| | | | |
|---|---|---|---|
| 3,647,026 | 3/1972 | Alexander et al. | 186/1 C |
| 3,951,461 | 4/1976 | DeFeudis | 302/27 |
| 4,073,368 | 2/1978 | Mustapick | 186/1 C |
| 4,111,282 | 9/1978 | Vayda, Jr. | 186/1 C |
| 4,284,370 | 8/1981 | Danier et al. | 406/86 |
| 4,638,312 | 1/1987 | Quinn et al. | 340/825.35 |
| 4,675,515 | 6/1987 | Lucero | 235/381 |
| 4,712,650 | 12/1987 | Campbell | 186/41 |
| 5,020,688 | 6/1991 | Power | 221/150 A |
| 5,105,979 | 4/1992 | Bakx et al. | 221/150 HC |
| 5,113,974 | 5/1992 | Vayda | 186/53 |
| 5,158,155 | 10/1992 | Domain et al. | 186/53 |
| 5,354,152 | 10/1994 | Reinhardt et al. | 406/3 |

FOREIGN PATENT DOCUMENTS

| | | | |
|---|---|---|---|
| 509125 | 9/1930 | Germany . | |
| 2514442 | 10/1976 | Germany . | |
| 56-3229 | 1/1981 | Japan . | |
| 2202694 | 8/1990 | Japan | 221/278 |
| 1373088 | 11/1974 | United Kingdom . | |

*Primary Examiner*—Kenneth Noland
*Attorney, Agent, or Firm*—Wood, Herron & Evans, P.L.L.

[57] ABSTRACT

A system is provided for vending food products such as individually packaged beverages from a temperature maintained storage unit to a remote location such as a service counter or the service island of a gasoline service facility. Preferably, a pneumatic tube conveyor moves the product from storage to a dispensing unit at the remote location in response to product selection made by a customer at the remote location. Preferably, payment for the sale of the product item is coordinated with information from another vending or accounting system such as a gasoline charge system that includes a credit card reader associated with a fully automated self-service gasoline pump. The product is moved through the conveyor in a reusable carrier or in its own product packaging container that serves as a carrier.

26 Claims, 5 Drawing Sheets

TEMPERATURE MAINTAINED FOOD DISPENSING SYSTEM AND METHOD

This is a continuation-in-part of U.S. patent application Ser. No. 08/404,243, filed Mar. 15, 1995, now abandoned entitled Temperature Maintained Beverage Dispensing System and Method.

FIELD OF INVENTION

This invention relates to the delivery and dispensing of individually packaged products such as beverages or other items of food, and, more particularly, to the delivering and dispensing of temperature controlled beverages or other food product items in individual containers.

BACKGROUND OF THE INVENTION

The retail sale of beverages for immediate consumption is typically carried out in one of two ways: either by over-the-counter sale by a server or attendant at a store or other indoor location or by mechanized unattended sale from a drink dispensing machine, which may be at an indoor or an outdoor location. Beverages that are to be sold for immediate consumption are usually stored at a refrigerated temperature that is several degrees above the freezing point of water. The refrigeration is most commonly achieved by cooling a storage enclosure within the store building that is otherwise maintained at a typical room temperature. In addition, in geographic locations where temperatures drop below freezing, some heating of the building that surrounds the beverage storage enclosure maintains the building at the room temperature. With outdoor dispensing machines, such machines are usually not employed at times where below freezing temperatures are expected.

Systems have been provided for the marketing of beverages such as juices and soft drinks at locations more convenient to consumers. Such locations have included many that are frequented by vehicular or pedestrian traffic, such as gas stations and entertainment facilities. These locations have included concession counters and convenience stores that have been integrated with the gas station or entertainment facility.

Outdoor retail locations such as the vehicle service islands of gas stations are increasingly being provided with payment devices such as credit card readers that are operatively connected with the vehicle service devices, such as the gasoline dispensing pumps, for use by a customer purchasing gasoline, for example, to pay for the purchase without leaving the vicinity of the vehicle. At such locations, the customer is, nonetheless, required to enter the adjacent store facility to purchase snacks or beverages. The logistics of purchasing such additional products subjects the customer to an additional inconvenience, requiring some additional time and effort, which, in a certain percentage of cases, the consumer elects to forego, resulting in a loss to the retailer of a potential sale. Furthermore, the use of card readers at self-service gasoline pumps provides the capability for completely unattended gasoline sales, with the customer delivering the purchased gasoline from the self-service pump and making automatic payment without the intervention of a service attendant. Such a capability makes possible the sale of gasoline at night or at other times when no attendant is on duty, since there is no cash that must be handled and no requirement for the added security incident to a facility at which cash will be accepted and stored. At such unattended facilities, conventional systems for providing additional products such as beverages to the gasoline customer are not readily adaptable.

The vending of sandwiches and other solid food products for immediate consumption in the facilities discussed above present similar problems. Such products must usually be contained in their individual packaging, must be protected from environmental conditions such as excess heat or cold, and are preferably cooled or heated prior to or upon vending so as to require a freezer or a heating device such as a broiler or microwave oven that is preferable not to maintain at the vending area.

Accordingly, there is a need in the retailing industry, particularly for the sale of cool beverages, or temperature maintained, cooled or heated food items at locations such as gas stations, for delivering and dispensing such products to the consumer at a location of maximum convenience.

SUMMARY OF THE INVENTION

A primary objective of the present invention is to provide a method and system for delivering and dispensing a temperature maintained beverage or other food product in individual containers to a consumer at a non-temperature controlled location that is of greater convenience than would be a temperature controlled location at which the product is stored.

It is a further objective of the present invention to provide a potentially unattended system and method for delivering a temperature maintained beverage or other product to a consumer at a non-temperature controlled location, particularly by maintaining the product at a location that is remote from the dispensing location and is secure. It is a further objective of the present invention to provide such a system and method by which completely unattended consumer sales of products such as beverages and other food products for immediate consumption may be carried out, According to the principles of the present invention, there are provided a method and system by which individually packaged products, particularly beverages, such as soft drinks, solid food items such as sandwiches and ice cream, and other consumable convenience products, are maintained in a temperature controlled environment at a storage location that is remote from a point of sale to a consumer desiring such product for immediate consumption. With the preferred embodiment of the invention, product is ordered and may also be paid for by the consumer at the point of sale adjacent a service counter, an outdoor access lane, which may be at a drive-up location such as at vehicle accessible a gasoline pump island at a gasoline service station, or at some other goods and services vending area, such as a general store counter, a ticket counter, an exercise machine, or other such location. The ordered product is delivered, in response to the order, from the storage location by way of a pneumatic tube.

In accordance with the preferred embodiment of the invention, a mechanism is provided that selects a product in response to the entry of a selection command by the consumer at the point of sale, and feeds the product in its packaging container, either by loading the packaging container into a pneumatic carrier, preferably an adequately insulated and padded capsule or carrier, for delivery through the pneumatic tube, or by loading the packaging container directly into the pneumatic tube, with the container appropriately configured to fit in and through the tube. A pneumatic tube conveyor system delivers the product to the point of sale at which the product may be automatically removed from the capsule or otherwise presented to the consumer. In one preferred form of the invention, accounting for payment for the order is carried out by way of coded information identifying the user account and entered at the point of sale, for example by charging or otherwise posting the payment to an account of the customer. Preferably, a charge is made to a gasoline charge account that is identified by reading a gasoline credit card of the user in connection with the purchase of gasoline or other such product.

The advantages of the present invention include that of convenience to the consumer. In addition, the method and system of the present invention facilitate the sale of beverages and other such consumable products where sales might not otherwise take place. Such sales may also take place without an attendant being on duty to provide the product or to collect the payment for the product, because the credit charging capacity of the gas dispensing or other such operation can be utilized. Further, such product sales will command a higher price due to the additional convenience that is provided. As a result, the profitability of operating a retail facility such as a gas station is likely to be increased. With the system of the present invention, the products dispensed are protected from heat and cold, and the exchange of cash in connection with such a product's sale is avoided, thus eliminating one element of the problem of the security of the facility.

These and other objectives and advantages of the present invention will be more readily apparent from the following detailed description of the drawings of the preferred embodiment of the invention, in which:

DETAILED DESCRIPTION OF THE DRAWINGS

Figures 1, 1A, 1B:
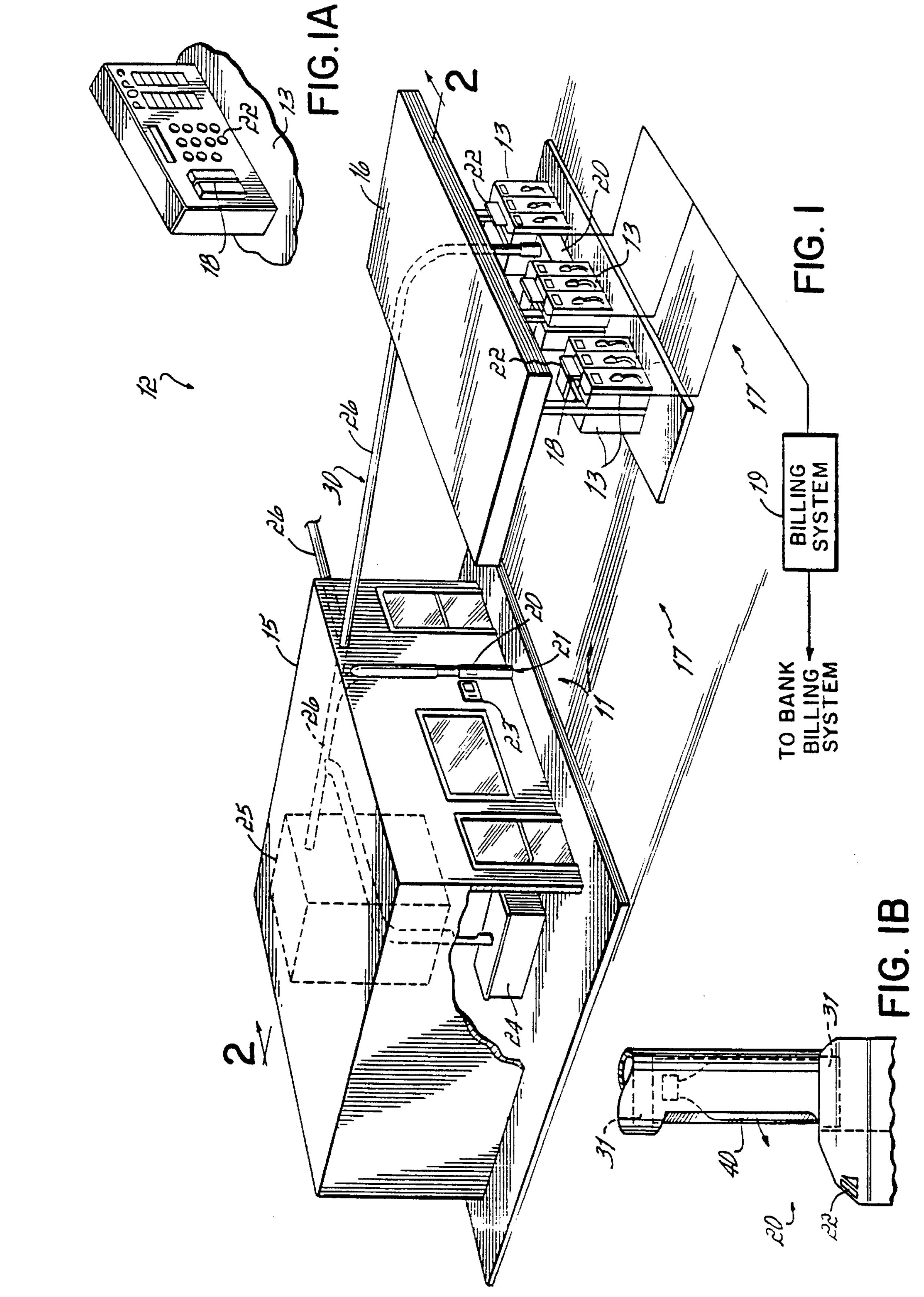
FIG. 1 is a perspective view of one preferred embodiment of a system according to principles of the present invention.
FIG. 1A is a schematic perspective view of a card reader of the system in one alternative embodiment to that of FIG. 1.
FIG. 1B is a schematic perspective view of an alternative dispensing unit of the system of FIG. 1.

FIG. 1 illustrates one preferred embodiment of the invention in the form of an automated retail system 10 that includes an automated beverage delivery and dispensing system 11 in combination with a self-service gasoline dispensing facility 12. The gasoline dispensing system portion 12 of the combination 10 typically includes a building 15 that may be an attended retail store with one or more remote outdoor gasoline pumps 13 located at one or more remote outdoor islands 16. Adjacent the store building 15 and the island 16 are provided one or more vehicle lanes 17 that render the building 15 and the pump island 16 directly accessible to the vehicles of customers. In all but ideal climates, the building 15 is usually provided with climate control such as heating and air-conditioning, while the pump island, being outdoors, is at the ambient temperature dictated by the climate.

Pump islands 16 are increasingly being provided, even in the prior art systems, with card readers 18 that are electrically interconnected with on-line banking or billing systems 19, often by way of telephone lines. With such systems, gasoline customers of the facility 12 are able to purchase gasoline without the assistance of an attendant, either to pump the gasoline or to collect the payment therefor, and can do so without leaving the vicinity of their vehicles in the lanes 17.

With the present invention, the addition of the beverage dispensing and delivery :system 11 provides the capability for the gasoline customer of the facility 12 to also purchase beverages with the same convenience as is possible for the purchase of gasoline, and at the same time. This is provided by including in the system 11 one or more beverage dispensing units 20 adjacent the gas pumps 13 at each of a plurality of the gasoline pump islands 16 or at another outdoor location 21 adjacent the traffic lanes 17. Adjacent or included in the credit card reader 18 is provided a panel 22 by which the customer may add to his gasoline purchase the selection and purchase of a beverage, as illustrated in FIG. 1A. Alternatively or in addition, a separate card reader 23 may be provided at any of the dispensing units 20, for example at the unit at location 21 that is distant from the reader 18 at the pump island 16, having such a panel 22, so the consumer may order such a beverage, as illustrated in FIG. 1. Also, a dispensing unit 20 may be provided at an attended counter or indoor room temperature location 24, which is tied into a cash register payment or charge system within the building 15.

The beverage system 11 is further provided with a temperature controlled storage vault 25 that is preferably enclosed within the store facility 15 and thereby generally refrigerated or otherwise temperature maintained at approximately 5° C. The vault 25 is interconnected with each of the dispensing units 20 by one of the pneumatic tubes 26 of a pneumatic delivery system 30 of a type more particularly illustrated in FIG. 2.

Figure 2:
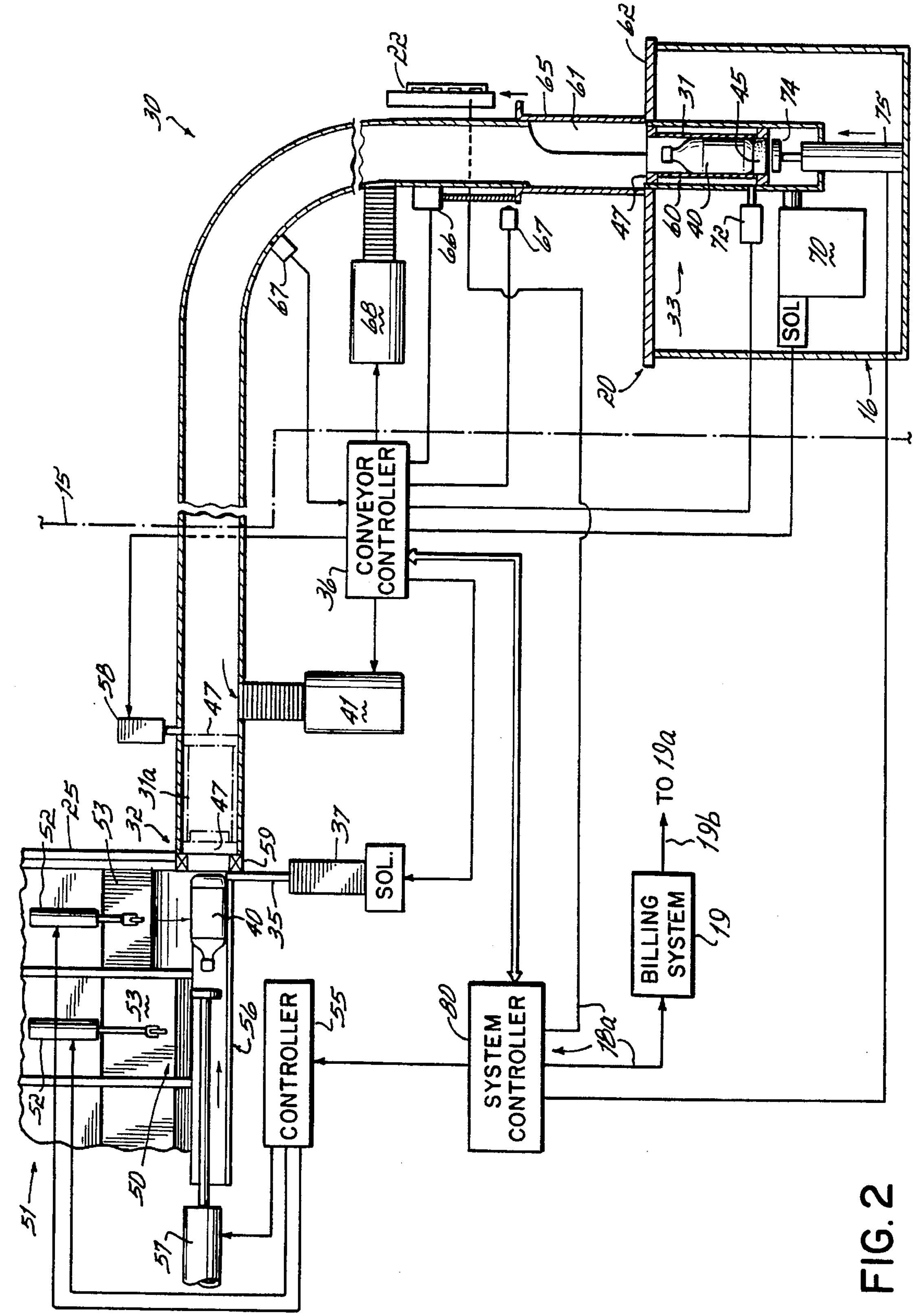
FIG. 2 is a cross-sectional view of the system of FIG. 1 along the line 2—2 of FIG. 1, illustrating, in one portion thereof, a carrier or capsule being loaded with product and, in another portion thereof, a capsule that has been delivered to the point of sale.

Referring to FIG. 2, the pneumatic delivery system 30 includes the tube 26 of generally circular cross-section, which extends from the vault or beverage storage unit 25 within the store building 15 and the beverage dispensing unit 20 at the gas pump island 16. Within the tube 26 is contained a carrier 31, which, during normal operation of the pneumatic delivery system 30, is not removable from the tube 26, although the carrier 31 may be removed from the tube 26 by way of a service door (not shown) in the tube 26 at one or more locations along the tube 26. The tube 26 has a single loading end 32 at the vault 25 and a single discharge end 33 at the dispensing unit 20, with only one carrier 31 per tube 26, although more than one such tube 26 may be provided to connect the vault 25 with more than one dispensing unit 20 at different outdoor or other locations.

At the loading end 32 of the tube 26, a pneumatically or electrically operable gate 35 is provided, which is operated in response to a signal from a pneumatic delivery system or conveyor controller 36 to a gate actuator unit 37. The gate 35 is moveable between an open position at which a filled beverage container 40 may be loaded from the vault 25 into the carrier 31 and a closed position that will allow a vacuum to be drawn between the gate 35 and the carrier 31 to move an empty carrier 31 from the dispensing unit 20 toward the vault 25. Such a vacuum is applied by a high volume pump 41 being operated at a vacuum. The actuator unit 37 may also be provided with valving, a pump or other devices to vent or otherwise control the pressure within the tube 26 immediately inside of the gate 35 to insure the desired motion of the carrier 31 in the portion of the tube between the gate 35 and the pump 41.

Figure 3A:
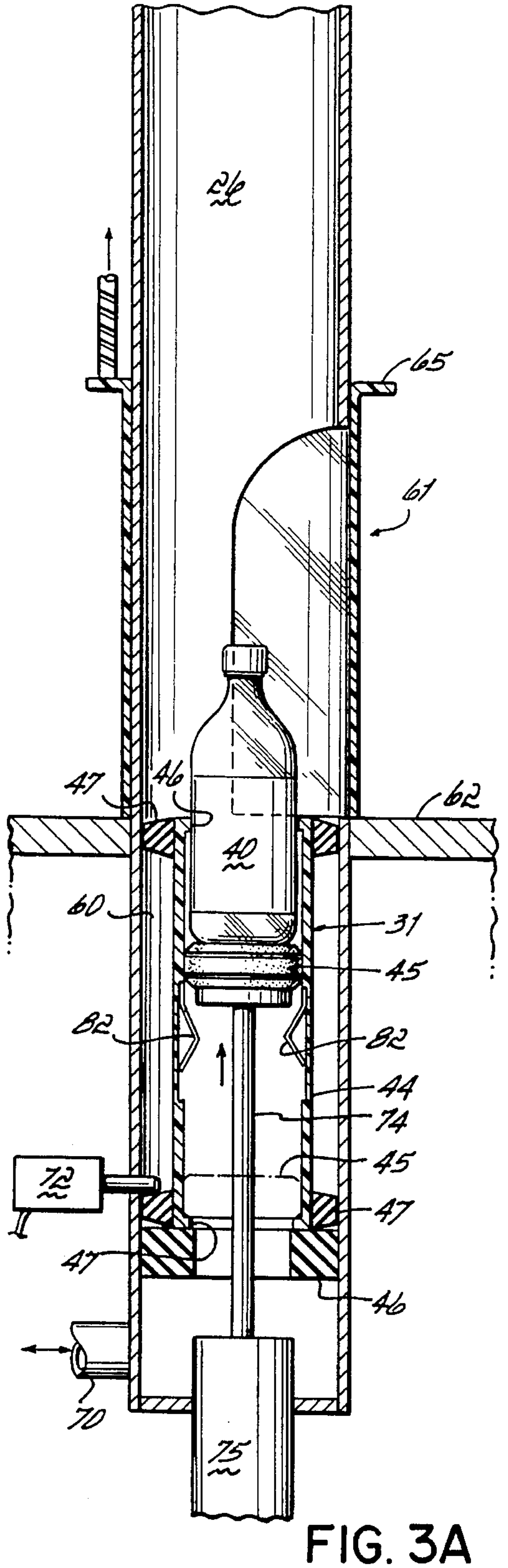
FIG. 3A is a cross-sectional view illustrating a portion of FIG. 2 with the capsule in an intermediate stage of being unloaded of product.
Figure 3B:
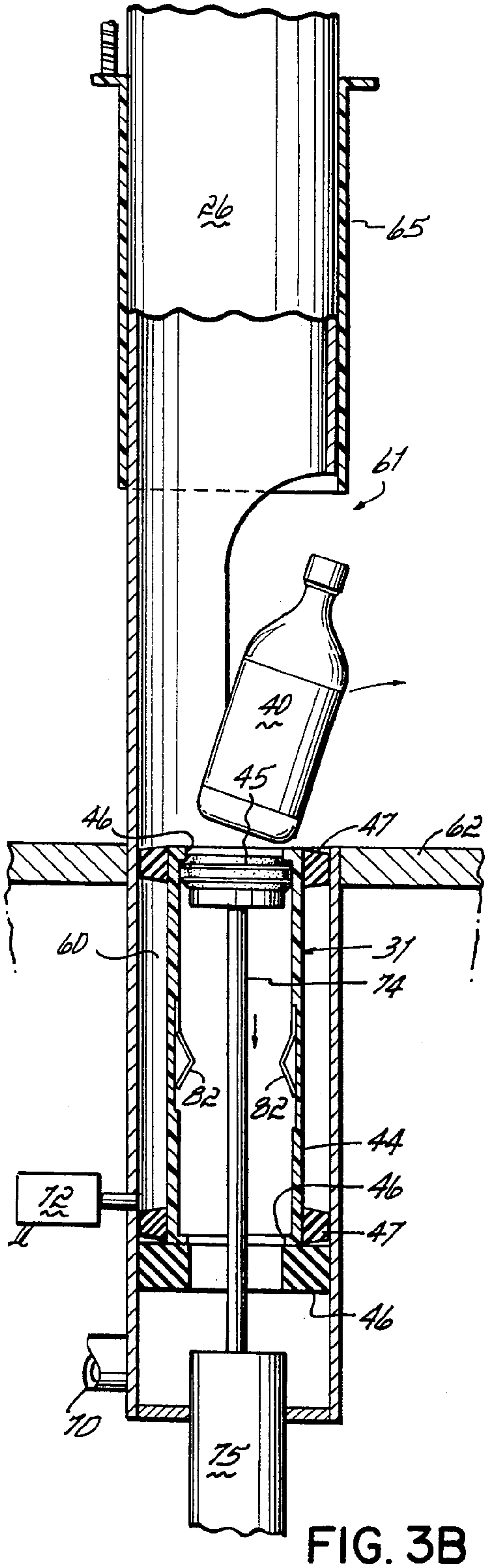
FIG. 3B is a cross-sectional view similar to FIG. 3A with the capsule in a final stage of being unloaded of product.

The configuration of the carrier 31, which is illustrated in more detail in FIGS. 3A and 3B, is formed of a cylindrical tubular body 44 formed of metal or hard plastic, which is open at both ends. The inside surface of the body 44 is formed of a padded and thermally insulative material 43. Within the body 44 is slidably mounted a circular plunger 45. The inner surface of the insulative material 43 formed of a material that is adapted to permit the plunger 45 to slide fairly freely but to form at least a moderate air seal with the body 44. The plunger 45 is contained within the body by circular stops 46 formed in the opposite ends of the body 44. The plunger 45 slides sufficiently freely in the body 44 so as to be drawn to the low pressure side of the carrier 31 and thus locate itself at the leading end of the carrier 31 as the carrier 31 is being pneumatically forced through the tube 26. At the ends of the body 44, around the outside of the stops 46, is provided a pair of annular bumpers 47, preferably of a moderately hard rubber or similarly elastic synthetic material. The bumpers 47 support the carrier 31 in a low friction slidable contact with the wall of the tube 26 and hold the body 44 in spaced relationship to the wall of the tube 26 to facilitate the movement of the carrier 31 around curves and bends in the tube 26. The plunger 45 provides both a seal to facilitate movement of the carrier 31 in the tube 26 and a support for the bottom of the container 40 in the carrier 31. The inside surface of the body 44 provides a small amount of friction force to hold a container 40 therein while the carrier 31 is moving, but not so much friction as to interfere with the loading of the container 40 into the carrier 31. In addition or in the alternative, other elements may be provided to hold the product container 40 in the carrier 31, such as pins or, as illustrated in FIGS. 3A and 3B, for example, by spring clips 82.

Referring again to FIG. 2, within the vault 25 is provided a mechanism 50 for feeding beverage containers 40 of any selected one of a number of types from a supply 51 to the input end 32 of the tube 26. Any one of a number of retrieving and feeding devices may be provided as the mechanism 50 to drop or robotically retrieve and place the selected container 50 into the open end 32 of the tube 26. In FIG. 2, a drop-shoot vending machine type of dispensing unit is illustrated as the mechanism 50 for simplicity, in which actuators 52 open a door 53 at the bottom of the supply 51 to individually drop one beverage container 40, in accordance with a signal from a dispenser controller 55, onto a loading trough 56, with the bottom of the container 40 facing the open end 32 of the tube 26. In this position, a loading ram 57 pushes the container 40 into the carrier 31, also in response to a signal from the dispenser controller 55.

To be loaded with a container of beverage 40, the carrier 31 must be secured in the position illustrated by the phantom lines 31 a in FIG. 2. In this position, one of the bumpers 47 will rest against a fixed bumper or stop 59 surrounding the opening at the open end 32 of the tube 26, and is of smaller diameter than the tube 26 or the bumpers 47 of the carrier 31 to trap the carrier 31 in the tube 26. In this position, a solenoid actuated locking member 58, which is activated by a signal from the conveyor controller 36, holds the carrier 31 immobile while the container 40 is being loaded into the carrier 31. During loading, of course the gate 35 is open. Also during loading, the plunger 45 may be in any position initially, but it will be forced to the end of the carrier 31 that is farthest from the end 32 of the tube 26 by the pushing of the container 40 by the ram 57. The carrier 31, with the slidable plunger is symmetrical and, with some tube configurations, can be used in either direction and loaded with containers 40 from either side.

The tube 26 usually extends horizontally from the vault 25 but may rise or fall somewhat on the way to the location of the dispensing unit 20. Approaching the dispensing unit 20, the tube 26, in the preferred embodiment, changes to a vertical orientation to enter the dispensing unit 20 from the bottom or, as shown in the illustrated embodiment, from the top. The discharge end of the tube 26 at the dispensing unit 20 is preferably closed and contains a carrier holding space 60, approximately as long as the carrier 31, that spaces the closed end 33 of the tube 26 from a delivery window 61 in the side of the tube 26. A horizontal surface 62 in the form of a counter top covers the dispensing unit 20 and aligns with the boundary between the top of the holding space 60 and the delivery window 61. The delivery window 61 faces the customer, for example, toward the window of a vehicle 64 on the access way 17, and is provided with a door or cover 65 that, when in a closed position, pneumatically seals the window 61, as in FIG. 3A, and when in an open position allows a container 40 to be removed from the tube 26, as in FIG. 3B. The door or cover 65 may be configured to open and close by vertical movement on the tube 26, or by rotational movement around the tube 26, or by hinged motion or otherwise. Preferably, the opening and closing of the door is achieved by the actuation of a door operating motor 66 in response to a signal from the conveyor controller 36. The door 65 may be made of a transparent plastic material, which is particularly desirable if manual opening of the door 65 or manual activation of the door opening actuator 66 is desired.

In the vertical portion of the tube 26, either near the end 33 of the tube 26 or, preferably, just above the delivery window 61, is an additional high volume pump 68, which is also controlled by signals from the conveyor controller 36. The pump 68 operates in cooperation with the pump 41 to move the carrier 31 back and forth between the vault 25 and the dispensing unit 20. This pump 68 may be a vacuum pump or may also be capable of operation at positive pressure. When a carrier 31 is being moved from the vault 25 toward the dispensing unit 20, the pump 68 will operate at a vacuum, at least until the carrier 31 is in a position and moving at a speed sufficient to insure that it will continue to drop by gravity toward the dispensing unit 20. The position and speed of the carrier 31 may be verified by the provision of one or more sensors, such as, for example, optical sensor 67 in the wall of the tube 26. When the carrier 31 has reached the point of the sensor 67, for example, the pump 68 and/or a pressure control unit 70, which may include one or more valves, vents to atmosphere or pumps, will be operated to insure that some pressure is provided in a sealed space in the tube 26 below the arriving carrier 31 to cushion the arrival of the carrier 31 at the dispensing unit 20, and to bring it to rest gently in the space 60 adjacent the end 33 of the tube 26.

When a carrier 31 has arrived at the space 60 containing a beverage container 40, a locking solenoid 72 is actuated in response to a signal from the conveyor controller 36 to lock the carrier 31 in position in the tube 26 so that the beverage container 40 therein can be unloaded. The unloading of the beverage container 40 is accomplished by the movement of a piston 74 of an unloading cylinder 75 that is actuated, also in response to a signal from the conveyor controller 36, as is better illustrated in FIGS. 3A and 3B. As illustrated in FIG. 3A, the actuation of the cylinder 75 extends the piston 74 upwardly into contact with the underside of the plunger 45. With the locking solenoid 72 holding the carrier 31 against movement in the space 60, the plunger 45 slides upwardly in the carrier 31, lifting the container 40 upwardly into alignment with the window 61 above the counter surface 62. When the container 40 is adjacent the window 61 with the plunger 45 aligned with the countertop 62, the door opening mechanism 66 is actuated to open the door 65 so that the container 40 can be removed by the customer, as illustrated in FIG. 3B.

An alternative structure for the pneumatic delivery system 30 may provide for the carrier 31 to have a door or opening in the tubular body 44 for the removal of the contents by the customer, as the carrier 31 presents the product at the dispensing unit 20, as illustrated in FIG. 1B. Pneumatic delivery systems that include additional details of systems such as system 30 are well known and may be utilized with the system 30 described herein.

The operation of the conveyor controller 36 and the dispenser controller 55 are coordinated and controlled in response to orders placed by customers on the panel 22 and in response to payments made by way of the card reader 18, through a beverage delivery system or main controller 80. For example, when a gasoline customer purchases gasoline and inserts a charge card in the card reader 18, he may be prompted with a message asking if an additional purchase of a beverage is desired. If so, an order may be placed by selecting the brand and type of beverage desired by pressing a button on the panel 22. This button selection transmits the beverage order to the main controller 80 which causes the price of the order to be added to the gasoline charge made through the billing system 19 (FIG. 1) to the account identified by the card read by the card reader 18. If the carrier 31 is in the position 31 a indicated by the phantom lines near the loading end 32 of the tube 26 in FIG. 2, the gate 35 is opened, the dispensing controller 55 is signaled by the controller 80, which causes the dispensing controller 55 to activate the appropriate actuator 52 to open the door 53 to drop the selected beverage in its container 40 into the trough 56. Thereupon, the dispenser controller 55 energizes the cylinder 57 to push the dropped container 40 from the trough 56 into the carrier 40. When the controller 80 determines that the container 40 has been loaded into the carrier 31, through feedback signals from the controller 55 or through additional sensors (not shown) that may be provided, the conveyor controller 36 is signaled to initiate the transporting of the loaded carrier 31 to the dispensing station 20.

The transporting of the carrier 31 to the dispensing station or unit 20 begins with the assurance that the door 65 that covers the window 61 is closed and that the pressure control unit 70 is set to insure that the lower end of the tube 26 is sealed. Then the pump 68 is energized. The gate 35 will remain open at this time or there will be other openings to allow a venting of atmosphere to the vault side of the carrier 31. This will cause the carrier to be drawn through the tube 26 toward the pump 68. When the carrier 31 has reached the vicinity of the sensor 67 and is moving sufficiently to cause it to reach the vertical section of the tube 26, the pump 68 is turned off, allowing the carrier 31 to free fall. However, in that the lower portion of the tube 26 is sealed pressure in the tube 26 below the carrier 31 will inhibit the fall of the carrier 31. Either by providing for appropriate sealing in the lower end of the tube 26 to allow for a controlled escape of air from the tube 26, or by operating the pressure control unit 70, which is optional, pressure can be maintained in the lower portion of the tube 26 that allows the carrier to be gently lowered to the space 60 at the lower end of the tube 26 so as to rest on a stop 81 provided there, at which point it is locked by the actuation of the lock solenoid 72 in response to a signal from the conveyor controller 36.

Then, the piston 74 is actuated to lift the container 40 on the plunger 45 to the window 61, the door 65 covering the window 61 is opened, and the beverage container 40 is removed. Thereupon, the door 65 is closed, the gate 35 at the upper end of the tube 26 is closed, the pressure control 70 is actuated to vent the lower end 33 of the tube 26 to atmosphere, and the motor 41 is operated to apply a vacuum to the tube 26. The vacuum in the tube 26 first draws the plunger 45 to the top of the carrier 31 where it rests against the stop 47. Then, the pressure differential on the plunger 45 causes the carrier 31 to be forced upwardly in the tube 26 toward the pump 41. Pump 41 is turned off as the carrier 31 approaches, allowing the carrier to continue toward the stop 59 at the end 32 of the tube 26. At this position, the carrier 31 may be stored to await another order.

Figure 4A:
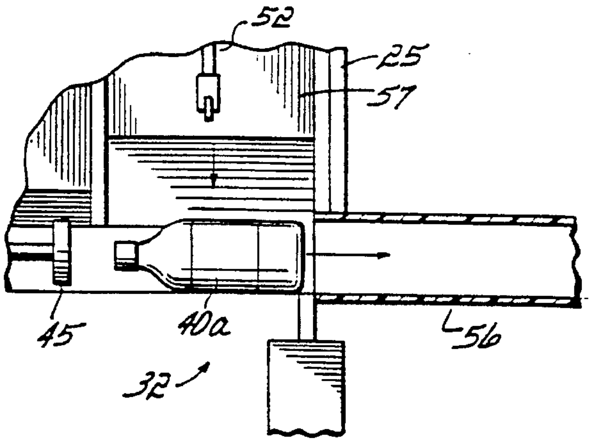
FIG. 4A is a sectional view of a portion of FIG. 2 illustrating the loading of a beverage in its packaging container into a pneumatic tube so that the packaging container forms the carrier.

The system of the present invention can also be used without a separate carrier 31, but rather with the packaging container such as the beverage container 40 serving the function of the carrier 31. This is practical with blow molded plastic beverage bottles and other reasonably shatter resistant containers, as for example, container 40*a*, as illustrated in FIG. 4A, which shows the container 40*a* being loaded directly into the tube 26 at the loading end 32 of the pneumatic system 30 by actuation of the plunger 45. With such direct loading of the container 40*a* into the tube 26, the internal cross-section of the tube 25 must match the external cross section of the container 40*a*. Preferably, the tube 26 is configured to accept standard beverage packaging containers.

Figure 4B:
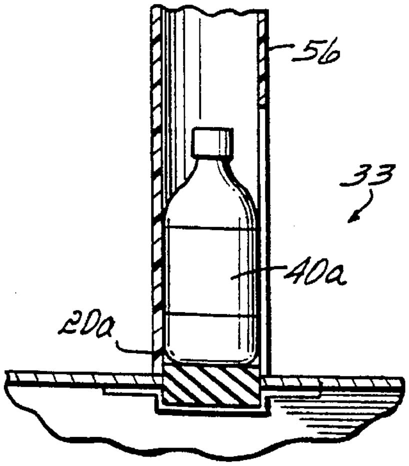
FIG. 4B is a sectional view of a portion of FIG. 2 illustrating the delivery of the beverage of FIG. 4A in its container.

FIG. 4B illustrates the container 40*a* at a dispensing unit 20*a* at the discharge end 33 of the pneumatic system 30. Such a pneumatic system may include the air cushion decelerating feature as described above or some other structure to slow the container 40*a* upon its arrival at the dispensing unit 20*a*.

Figure 4C:
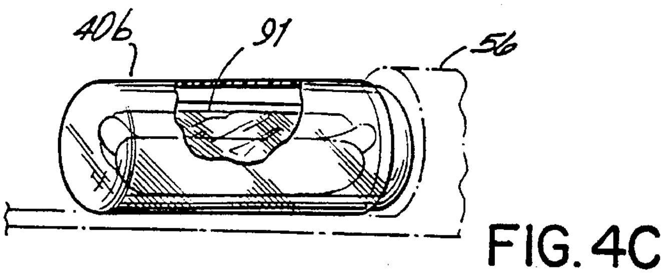
FIG. 4C is an isometric view of a food item in its packaging container for delivery through the pneumatic tube of the system of FIG. 1.

FIG. 4C illustrates a food packaging container 40*b*, such as a plastic tubular can with a wide lid at one end, that is of the same exterior cross section as the plastic beverage container 40*a* of FIGS. 4A and 4B. In the container 40*b* may be provided a sandwich 91, which may be delivered heated when selected by a customer. In such system, some sort of heating unit (not shown) such as a warmer that stores the product in heated condition, or microwave unit that heats the product in response to an order. Or the sandwich may be a cold sandwich that is stored under refrigeration. The food product is dispensed and then loaded in its warmed or refrigerated condition into the tube 26 in the same manner as a beverage is loaded, as described above. Similarly, a frozen product such as ice cream or some other food product may be similarly provided. Such product may be placed in the container 40*b* in a plastic film or paper wrapping or with such other packaging material as is necessary to insure its safe delivery through the tube 26. Such food items are preferably maintained in a prepackaged condition in such container 40*b* in the storage unit 25.

Figure 5A:
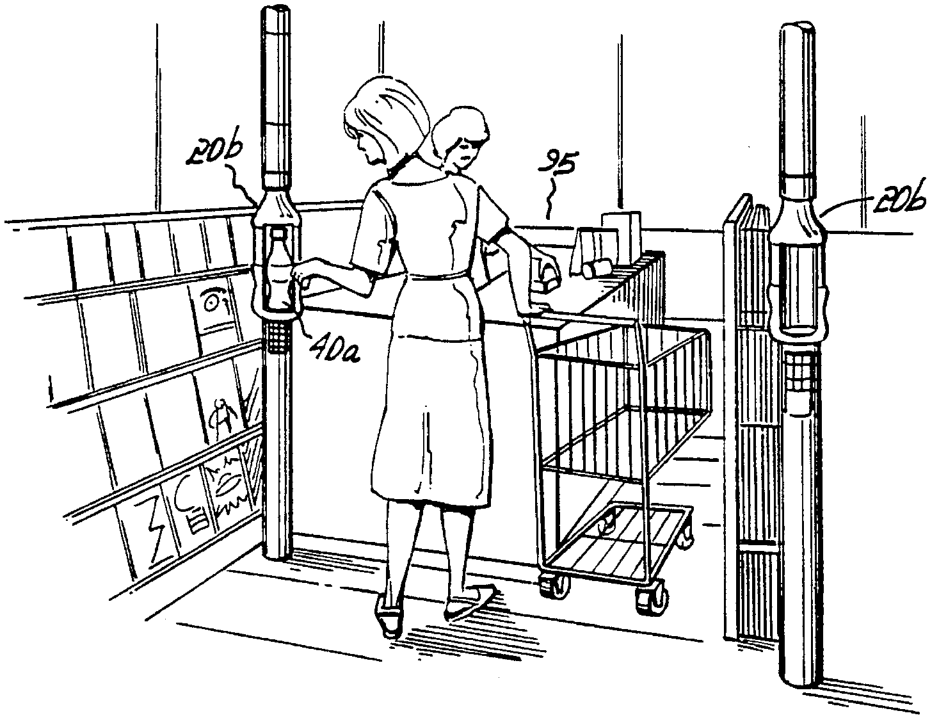
FIG. 5A is a perspective view of an alternative embodiment of the system of FIG. 1.

While the system 10 is disclosed in a gasoline station setting, it should be appreciated that such a system can be used in combination with other vending systems. Some features of the invention can be realized in a stand-alone system for dispensing food or beverages sold independently of other products. For example, in FIG. 5A a system 10*a* is illustrated in which the pneumatic system 30 thereof has its dispensing unit 20*b* at the check-out lane of a super market. Such a system 10*a* may charge the purchase of an purchased item, such as a beverage carried in a container 40*a*, to a grocery order being accounted for at a check-out counter 95.

Figure 5B:
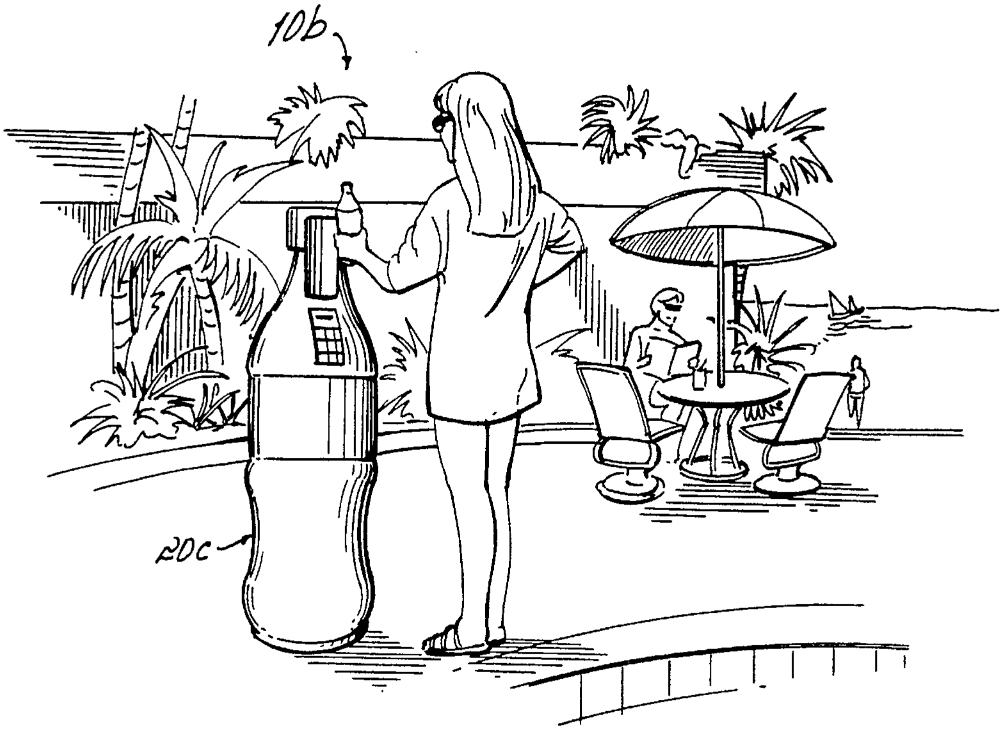
FIG. 5B is a perspective view of another alternative embodiment of the system of FIG. 1.

A further example is illustrated in FIG. 5B in which a dispensing unit 20*c* is provided in a system 10*b* at a recreational location such as a swimming pool or swimming club. Such a unit may contain its own charge card reader or, where at a membership facility or the like, accept a member code and charge the item to the member's account.

Figure 5C:
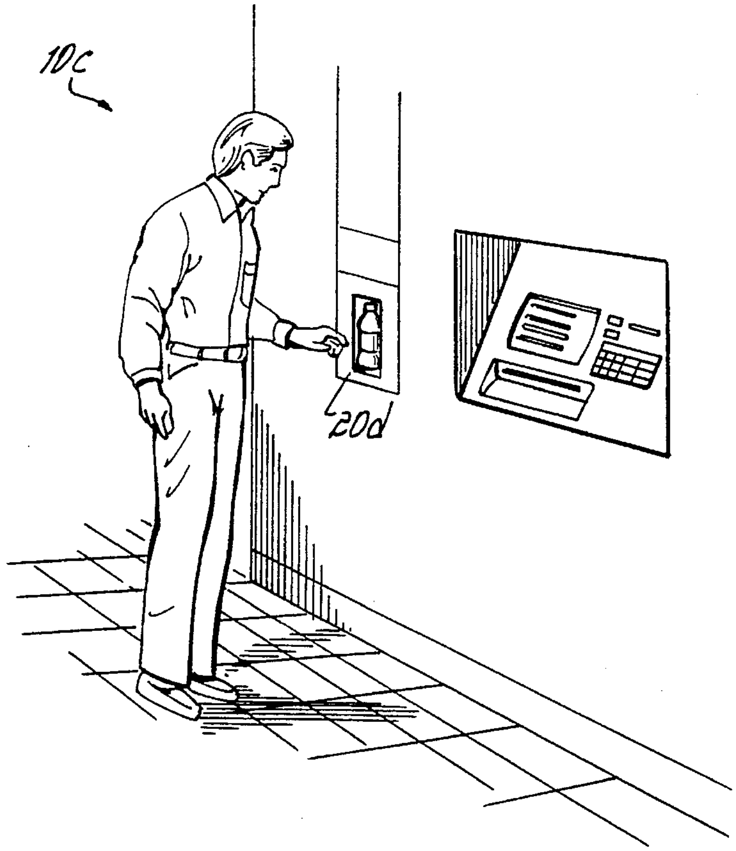
FIG. 5C is a perspective view of another alternative embodiment of the system of FIG. 1.

Further, FIG. 5C illustrates an example of a dispensing unit 20*d* of a system 10*c* that may be preferably associated with a device such as an automated teller machine or other accounting system at which an account of a customer is identified to facilitate a purchase.

Those skilled in the art will appreciate that the applications of the present invention herein are varied, and that the invention has been described in preferred embodiments. Accordingly, additions and modifications can be made without departing from the principles of the invention.

Accordingly, the following is claimed:

1. A system for vending individually packaged food products in their individual non-reusable packaging containers to customers at a customer location in an ambient temperature environment, for immediate consumption at a food service temperature that differs from the temperature of the ambient temperature environment, comprising:

a customer terminal at the customer location in an ambient temperature in the ambient temperature environment having an order entry device operable to generate an order command in response to order input from a customer and a packaged product dispensing unit operable to present a food product in its own individual non-reusable packaging container to the customer;

a food product supply terminal at a loading location that is physically separated from the customer location by an intervening building structure or partition or an otherwise useful space that is part of neither the customer terminal nor the supply terminal, the loading station including a food product supply enclosure having an environment therein maintained the food service temperature;

a pneumatic conveyor extending between the food product supply terminal and the product dispensing unit operable, when activated, to move an individually packaged food product in its packaging container from the supply terminal, across the intervening structure or space, between the two locations, to the dispensing unit; and a controller operable to activate the conveyor, in response to an order command from the order entry device, the controller being logically linked to a payment device that accepts payment for the product or charges payment therefor to the customer.

2. The system of claim 1 wherein:

the food product storage unit is a refrigerated unit configured to support a plurality of individual portion bottled beverages in plastic prefilled individual beverage containers at the food service temperature; and the pneumatic conveyor is operative to apply pneumatic pressure directly across a the plastic prefilled beverage container when loaded therein to move the bottled beverage across the structure or space to the customer terminal at the customer location.

3. The system of claim 1 wherein:

the order entry device includes a product selector operative to generate a product selection command in response to a product selection by the customer.

4. The system of claim 1 wherein:

the system includes and is interconnected with a diverse vending system for vending to the customer a diverse product or service that is distinct from the individually packaged food products, the diverse system having a payment subsystem for accounting for payment for the diverse goods or services provided by it to the customer, the payment subsystem being selected from the group consisting of a charge account subsystem, a cash payment subsystem, and a membership account subsystem; and the payment device being interconnected with the payment subsystem such that payment for the vended individually packaged food product is made through the payment subsystem of the diverse vending system.

5. A system for vending individually packaged food products comprising:

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

the food product supply terminal including a product storage unit having a temperature maintained interior;

the customer terminal being located in an ambient temperature environment;

the pneumatic conveyor including a reusable hollow carrier moveable therein having a thermally insulating wall and adapted to enclose a food product therein for transfer from the food product supply terminal to the product dispensing unit; and the pneumatic conveyor being operative, when activated, to apply a pneumatic pressure across the carrier to move the carrier from the food product supply terminal to the product dispensing unit.

6. A system for vending individually packaged food products comprising:

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

the food product supply terminal including a product storage unit having a temperature maintained interior;

the customer terminal being located in an ambient temperature environment;

a product loading mechanism operably connected with the product supply terminal and the pneumatic conveyor and operable when activated to load, from the supply terminal, a food product, in its container, to the pneumatic conveyor; and the controller being further operable to activate the loading mechanism in response to a command from the order entry device.

7. The system of claim 6 wherein:

the order entry device includes means for accepting a product selection from the customer and generating a product selection command in response thereto;

the storage unit is configured to store a plurality of supplies of different food products; and, the product loading mechanism is operable, when activated, to selectively load a product from one of the supplies in accordance with the product selection command.

8. The system of claim 7 wherein:

the product storage unit is a refrigerated unit configured to support a plurality of supplies of filled individual beverage containers.

9. A system for vending individually packaged food products comprising:

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

the pneumatic conveyor including a reusable hollow carrier moveable therein adapted to enclose a food product therein for transfer from the food product supply terminal to the product dispensing unit; and the pneumatic conveyor being operative, when activated, to apply a pneumatic pressure across the carrier to move the carrier from the food product supply terminal to the product dispensing unit.

10. A system for vending individually packaged food products comprising;

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

a product loading mechanism operably connected with the product supply terminal and the pneumatic conveyor and operable when activated to load, from the supply terminal, a food product, in its container, to the pneumatic conveyor; and the controller being further operable to activate the loading mechanism in response to a command from the order entry device.

11. The system of claim 10 wherein:

the order entry device includes a product selector operative to generate a product selection command in response to a product selection by the customer;

the supply terminal is configured to store a plurality of supplies of different food products; and, the product loading mechanism is operable, when activated, to selectively load a product from one of the supplies to the conveyor in accordance with the product selection command.

12. The system of claim 11 wherein:

the supply terminal is configured to support a plurality of supplies of filled individual beverage containers;

the product selector being operative to generate the product selection command in response to a beverage selection by the customer; and the product loading mechanism is operable, when activated, to selectively load a beverage from one of the supplies to the conveyor in accordance with the product selection command.

13. The system of any of claims 10 or 11 wherein:

the pneumatic conveyor is configured to receive a packaged food product in its packaging container at the supply terminal; and the pneumatic conveyor is operative, when activated, to apply a pneumatic pressure across the container to move the container and packaged food product from the food product supply terminal to the product dispensing unit.

14. The system of claim 13 wherein the packaged food product is a beverage in a prefilled beverage container, and wherein:

the pneumatic conveyor is configured to receive the beverage in its container; and the pneumatic conveyor is operative, when activated, to apply a pneumatic pressure across the prefilled beverage container to move the container and beverage from the supply terminal to the dispensing unit.

15. A system for vending individually packaged food products comprising:

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

the customer terminal being located remote from the supply terminal;

the system being located at a facility having at least one pedestrian or vehicular access lane and the customer terminal and the supply terminal being located on opposite sides of the access lane.

16. The system of claim 15 wherein:

the customer terminal is located at a gasoline service island and the food product supply terminal is located at a gasoline service station across a vehicle access lane from the customer terminal.

17. A system for vending individually packaged food products comprising:

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

the system being interconnected with a diverse vending system having a payment subsystem for accounting for payment for goods or services provided to the customer, the subsystem being selected from the group consisting of a charge account subsystem, a cash payment subsystem, and a membership account subsystem;

the payment device being interconnected with the subsystem such that payment for the vended packaged food product is made through the payment subsystem of the diverse vending system;

the diverse vending system being a gasoline vending system at a gasoline service facility having a gasoline service island which includes a gasoline pump and a credit card reader;

the payment subsystem being a credit card billing subsystem interconnected to the pump and to the credit card reader to automatically charge gasoline purchases to a charge account of the customer;

the customer terminal being located at a gasoline service island; and the payment device including connections to the billing subsystem of the gasoline vending system to automatically charge a purchase of the vended packaged food product to the charge account of the customer.

18. A system for vending individually packaged food products comprising:

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

the system being interconnected with a diverse vending system having a payment subsystem for accounting for payment for goods or services provided to the customer, the subsystem being selected from the group consisting of a charge account subsystem, a cash payment subsystem, and a membership account subsystem;

the payment device being interconnected with the subsystem such that payment for the vended packaged food product is made through the payment subsystem of the diverse vending system;

the diverse vending system being a product retail facility having a check-out lane thereat;

the payment subsystem including a cash register located at the check-out lane receiving payment from the customer for products vended through the diverse vending system;

the customer terminal being located at the check-out lane; and the payment device including connections to the cash register to automatically post a charge for the purchase of the vended packaged food product to a total at the cash register.

19. A system for vending individually packaged food products comprising:

a customer terminal having an order entry device operable to generate an order command in response to order input from a customer and a product dispensing unit operable to present a food product in its packaging container to the customer;

a food product supply terminal;

a pneumatic conveyor extending between the food product supply terminal and the product dispensing unit operable, when activated, to move an individually packaged food product in its packaging container from the supply terminal to the dispensing unit;

a controller operable to activate the conveyor, in response to an order command from the order entry device, the controller being logically linked to a payment device that accepts payment for the product or charges payment therefor to the customer;

the system being interconnected with a diverse vending system having a payment subsystem for accounting for payment for goods or services provided to the customer, the subsystem being selected from the group consisting of a charge account subsystem, a cash payment subsystem, and a membership account subsystem;

the payment device being interconnected with the subsystem such that payment for the vended packaged food product is made through the payment subsystem of the diverse vending system;

the diverse vending system being a membership facility of which the customer is a member;

the payment subsystem including a membership account of the customer;

the customer terminal being located at the membership facility; and the payment device including means for receiving data identifying the member to automatically charge the purchase of the vended packaged food product to the membership account of the customer.

20. A method of vending packaged food products in their individual non-reusable containers to customers at a customer location in an ambient temperature environment, for immediate consumption at a food service temperature that differs from the temperature of the ambient temperature environment, the method comprising the steps of:

providing a customer terminal at the customer location in an ambient temperature in the ambient temperature environment having an order entry device located thereat, the terminal being equipped with a product delivery unit operable to present a packaged food product in its own individual non-reusable packaging container to the customer; and providing a pneumatic conveyor having a tube extending from a loading station, that is at a loading location physically separated from the customer location by an intervening building structure or partition or otherwise useful space, across or through the structure or space to the product delivery unit of the customer terminal, the loading station including a food supply enclosure having an environment therein for maintaining a food product therein at the food service temperature; then in response to a command entered through the order entry device by a customer, loading into the tube at the loading station, a packaged food product at the food service temperature in its packaging container; then applying differential pneumatic pressure directly across the individual non-reusable container of the loaded packaged food product, in response to the command, to move the product through the tube across the structure or space and to the customer terminal at the customer location.

21. The method of claim 20 wherein:

the packaged food products include individual beverage products in individual prefilled beverage containers;

the method further comprises the step of storing the beverage products in a refrigerated enclosure maintained at the food service temperature at the loading station;

the product loading step includes the step of loading a beverage product in its prefilled beverage container from the refrigerated enclosure at the loading station into the tube; and the pressure applying step includes the step of applying the differential pressure directly across the beverage container to deliver a beverage to the customer at the customer terminal.

22. The method of claim 20 wherein:

the method includes the step of providing a selection of a plurality of different immediately consumable packaged food products at the loading station;

the customer terminal providing step includes the step of providing a customer terminal with the order entry device that includes a product selector; and the loading step includes the step of, in response to a product selection made by the customer with the product selector, loading into the tube at the loading station a selected one of the plurality of packaged food products into the tube at the loading station in accordance with the product selection.

23. The method of claim 20 wherein:

the customer terminal providing step includes the step of providing the customer terminal at a customer location of a diverse service or product vending system provided for vending a product or service other than the packaged food product to the customer, the diverse system having a payment information receiving device associated therewith;

the loading and pressure applying steps are performed to vend the packaged food product to a customer of the diverse product or service vending system; and the method further comprises the step of communicating information through the payment receiving device to a diverse payment accounting system account of the customer to process a payment or charge for the vended packaged food product.

24. A method of vending packaged food products comprising the steps of:

providing a customer terminal having an order entry device located thereat, the terminal being equipped with a product delivery unit operable to present a food product in its packaging container to the customer; and providing a pneumatic conveyor having a tube extending from a loading station to the product delivery unit of the customer terminal; then in response to a command entered through the order entry device by a customer, loading into the tube at the loading station, a prepackaged food product in its packaging container; then applying differential pneumatic pressure across the container, in response to the command, to move the product through the tube to the customer terminal;

the customer terminal providing step including the step of locating the customer terminal across an access lane from the loading station; and the pneumatic conveyor providing step including the step of extending the tube from a loading station across the access lane to the product delivery unit of the customer terminal.

25. A method of vending packaged food products, at a facility equipped with a diverse product or service vending system for vending to a customer thereof a product or service other than the packaged food products, the diverse system having a payment or charge accounting system associated therewith, to customers engaged in purchasing transactions of a product or service of the diverse vending system at a customer location thereof, which food products are for immediate consumption by the customer, the method comprising the steps of:

providing a customer terminal having an order entry device operable to generate an order command in response to order input from a customer, a payment device operable to generate a payment command in response to payment input information associated with the customer, and a product dispensing unit operable to present a prepackaged food product in its own packaging container to the customer;

providing a loading station that is physically separated from the customer location by an intervening building structure or partition or an otherwise useful space; and providing a pneumatic conveyor having a tube extending from the loading station to the product delivery unit of the customer terminal; then in response to a command entered through the order entry device by a customer, loading into the tube at the loading station, a prepackaged food product in its container; then pneumatically transporting the product through the tube, in response to the order command, from the loading station to the customer terminal; and communicating to the payment accounting system of the diverse product or service vending system, in response to the payment command, data of a purchase of the product by the customer and accounting for the purchase price of the vended packaged food product by payment or charge thereof through the payment or charge subsystem of the diverse vending system.

26. A method of vending packaged food products at a facility equipped with a diverse product or service vending system having a payment accounting system associated therewith, the method comprising the steps of:

providing a customer terminal having an order entry device operable to generate an order command in response to order input from a customer, a payment device operable to generate a payment command in response to payment input information associated with the customer, and a product dispensing unit operable to present a food product in its packaging container to the customer; and providing a pneumatic conveyor having a tube extending from a loading station to the product delivery unit of the customer terminal; then in response to a command entered through the order entry device by a customer, loading into the tube at the loading station, a prepackaged food product in its container; then pneumatically transporting the product through the tube, in response to the order command, from the loading station to the customer terminal; and communicating to the payment accounting system of the diverse product or service vending system, in response to the payment command, data of a purchase of the product by the customer;

the facility being a gasoline service station equipped with a gasoline vending system having a gasoline pump island and a credit card charge system associated with the gasoline vending system;

the customer terminal providing step including the step of providing the customer terminal at the island; and the communicating step including the step communicating information of the purchase of the product by the customer to an account of the customer maintained in the credit card charge system of the gasoline vending system.

* * * * *